United States Patent [19]
Ochi et al.

[11] Patent Number: 5,601,915
[45] Date of Patent: Feb. 11, 1997

[54] RETROREFLECTIVE SHEETING

[75] Inventors: Katsura Ochi, Kashiwa; Masaki Yoshizawa, Sano; Osamu Tanaka, Hiratsuka, all of Japan

[73] Assignee: Nippon Carbide Kogyo Kabushiki Kaisha, Tokyo, Japan

[21] Appl. No.: 404,608

[22] Filed: Mar. 15, 1995

[30] Foreign Application Priority Data

Mar. 18, 1994 [JP] Japan ................... 6-072862

[51] Int. Cl.⁶ ............................. B32B 5/16
[52] U.S. Cl. .................. 428/323; 428/72; 428/325; 428/327; 428/406; 428/407; 428/411.1; 428/507
[58] Field of Search ............ 430/126, 45; 428/40, 428/161, 325, 412, 461, 476.1, 483, 913, 323, 72, 240, 269, 327, 406, 407, 411.1, 507; 283/72; 359/518, 538, 572, 576, 546; 404/14

[56] References Cited

U.S. PATENT DOCUMENTS

| | | |
|---|---|---|
| 3,140,340 | 7/1964 | Weber ........................ 88/82 |
| 4,025,159 | 5/1977 | McGrath . |
| 4,052,525 | 10/1977 | Ide et al. . |
| 4,653,854 | 3/1987 | Miyata . |
| 4,897,136 | 1/1990 | Bailey et al. . |
| 4,968,063 | 11/1990 | McConville et al. ............ 283/72 |
| 4,983,436 | 1/1991 | Bailey et al. ................. 428/40 |

FOREIGN PATENT DOCUMENTS 2196653  8/1990  Japan .

*Primary Examiner*—William A. Krynski
*Attorney, Agent, or Firm*—Sherman and Shalloway

[57] ABSTRACT

Retroreflective sheeting having excellent weatherability under prolonged outdoor use, which comprises a support sheet in one side of which retroreflective glass beads are embedded as substantially a monolayer in such a manner that at least their non-reflective portions are exposed on said sheet; and a light-transmittable protective film provided on the glass beads on said support sheet, said protective film being partially fixed onto the support sheet; in which at least the surface layer of the support sheet in which the glass beads are embedded is formed of a resin composition comprising (a) thermofusible resin(s) having a glass transition temperature not higher than 50° C. and (a) cellulose derivative(s) having a glass transition temperature not lower than 90° C.

26 Claims, 1 Drawing Sheet

FIG. 1

RETROREFLECTIVE SHEETING

BACKGROUND OF THE INVENTION

1. Field of Invention

This invention relates to retroreflective sheeting which is useful for road signs, construction signs, vehicle number plates such as for automobiles, motorcycles, etc., safety goods such as apparel to prevent disasters, survival equipment, or for marking signboards, etc.

2. Description of Prior Art

Retroreflective sheeting which reflexes reflexed light to the light source is well known, and the sheeting has been widely used in aforesaid fields where its retroreflectivity is utilized. In particular, such retroreflective sheeting as encapsulated lens-type retroreflective sheeting whose retroreflective performance of light is enhanced by providing a layer of air between light-transmittable protective film and retroreflective glass beads, making use of low refractive index of air, has been finding continually expanding field of utility due to its excellent retroreflective performance.

Generally such an air layer-containing retroreflective sheeting is composed of a light-transmittable protective film and a support sheet, which face each other across a narrow air layer, and bonding portions for binding said two, which are formed by locally thermofusing and forming the fused parts of support sheet. In the support sheet, retroreflective glass beads are embedded substantially as a monolayer, in such a manner that the non-reflective portions of the glass beads are exposed on said support sheet.

The most important function desired of such retroreflective sheeting is high retroreflective performance. Besides, high weatherability to allow its use under severe conditions which are encountered in outdoor use, etc. while maintaining the excellent retroreflective performance over prolonged periods, is also one of the important requirements therefor.

Deterioration in the retroreflective performance during long-term outdoor use of an air layer-containing retroreflective sheeting is in most cases caused by breakdown of the cells in which air is sealed and subsequent infiltration of rain water or the like into the broken cells. Thus, hermetic property of sealed air cells is lost by, for example, cracks in the protective film caused by repetitive expansion-contraction cycle of the air in the sealed air cells accompanying ambient temperature variation or repetitive extension and constriction of a substrate such as metal plate onto which the retroreflective sheeting is adhered, which again is caused by ambient temperature variation; adhesion breakdown at the interface of the protective film and bonding portions; destruction of the bonding portions themselves or the support sheet itself. Then rain water or the like infiltrates into the cells to vary the refractive index condition in the cells which is an important factor of retroreflective performance of the sheeting, or the vacuum-deposited metal film or the like serving as the light-reflecting membrane deteriorates and loses its ability to reflect light, resulting in decrease of retroreflective performance.

A support sheet which constitutes the main part of such a retroreflective sheeting, serving as the bonds, the glass beads-holding layer as well as the walls of sealed air cells, plays an important role for achieving good weatherability to maintain the retroreflective performance over a prolonged period. Accordingly, various excellent properties are required for the support sheet, such as not only thermofusibility and formability sufficient to form the bonding portions (bonds), high adhesive strength to the protective film as thermofused and formed into the bonds, and high tensile strength as the bonds as well as the support sheet itself; but also pliability to withstand repetitive stretching and good weatherability to maintain the high performance level over prolonged outdoor use. It is still another important requirement that the bonds and the support sheet should be free from residual strain which is apt to cause breakdown of individual parts of the retroreflective sheeting.

Numbers of attempts have heretofore been made about the support sheet, to improve those various properties. For example, U.S. Pat. No. 4,025,159 (Japanese Patent Publication No. 13561/86) proposed to apply radioactive rays, after the support sheet is thermofused and formed into bonds (bonding structure), to the bonds to cause their crosslinking and improvement in their strength. However, according to this proposal the bonds are crosslinked to become hard and brittle, which causes such problems that pliability sufficient to withstand repetitive stretching can hardly be obtained, and the retroreflective sheeting itself also becomes hard. There is still another defect that crosslinkage of the bonds by radioactive irradiation causes volume contraction of the bonds leading to serious strain. Furthermore a crosslinkable component used in the crosslinking reaction under radioactive irradiation, such as one having unsaturated bonds, seldom completes the reaction under the irradiation but in most cases the unreacted component remains as it is in the support sheet or the bonds in the finished retroreflective sheeting. During use of such a sheeting, therefore, undesirable crosslinking progresses under external factors such as heat, sunshine, etc. to which the sheeting is exposed. It is found that this progress in crosslinking deteriorates adhesion between the protective film and the bonds or embrittles the support sheet or bonds, rendering the sealed air cells more apt to break.

U.S. Pat. No. 4,897,136 [Japanese Laid-open (KOKAI) Patent Application, KOKAI No. 121043/87] has proposed to use a high molecular weight thermoplastic resin as the material for the support sheet, whereby imparting toughness and flexibility to said sheet, and eventually imparting high toughness and adaptability to irregular surfaces to the retroreflective sheeting.

In this proposal, however, the improvements in toughness and flexibility of the support sheet rely on an increase in molecular weight of the material resin used for making same sheet. In consequence, attempts to secure the high toughness desirable for the bonds or the support sheet itself by increasing molecular weight of said material resin generally lead to impairment in thermofusibility and forming property of produced support sheets, which tends to decrease adhesive strength between the bonds and the protective film. Furthermore, pliability of the sheet also is impaired. Whereas, when the molecular weight of said sheet-forming resin is maintained at a low level to retain satisfactory thermofusing and forming property or pliability, the toughness is impaired and the object of said proposal cannot be accomplished. Moreover, resins used in the proposal such as aliphatic urethane polymers or copolymers of ethylene or propylene cannot provide sufficient weatherability, and the products are unsuitable for utilities requiring weatherability durable over prolonged periods.

Aside from above-cited prior art, U.S. Pat. No. 4,653,854 (Japanese Laid-open Patent Application KOKAI No. 194405/85) and Japanese Laid-open Patent Application KOKAI No. 196653/90 have proposed a two-layered structure for the support sheet, i.e., a support sheet composed of a surface layer (binder layer, upper side) and a reinforcing layer (lower side, support layer), with the view to solve the above-described problems. According to the proposals, the reinforcing layer is made of a crosslinked resin to impart tensile strength to the support sheet, which is combined with a surface layer formed of a crosslinked resin or non-crosslinked resin.

These proposals are useful for improving tensile strength of the support sheet by the presence of said reinforcing layer. However, when the surface layer is formed from a crosslinked resin, similar problem to the one as described as to U.S. Pat. No. 4,025,159 (Japanese Patent Publication No. 13561/86) is caused. Whereas, when the binder layer is formed from a non-crosslinked resin, again the problem as described as to U.S. Pat. No. 4,897,136 (Japanese Laid-open Patent Application KOKAI No. 121043/87) cannot be avoided.

Claim 1 of said Japanese Laid-open Patent Application KOKAI No. 196653/90, furthermore, discloses addition of an elastomer to the surface layer-forming thermofusible (thermoplastic) resin; and Example 2 of same Application, addition of a minor amount of cellulose acetate butyrate resin besides an elastomer. However, according to our experiments, no retroreflective sheeting having satisfactory physical properties and excelling in weatherability can be obtained, using elastomers satisfying the requirements set in this reference, i.e., an elongation at normal temperature of at least 50% and a tensile resistance at 70° C. of at least 120 kg/cm$^2$.

OBJECTS AND SUMMARY OF INVENTION

The object of the present invention resides in provision of a retroreflective sheeting which is free from the defects in conventional technology and has outstanding characteristics, through development of a support sheet having excellent thermofusing and forming property allowing easy thermal formation and hence being capable of providing high adhesive strength between the protective film and the bonds when thermofused and formed into the bonds; having concurrently excellent pliability causing little strain in the support sheet serving as the walls of sealed air cells as well as the bonds, exhibiting high tensile strength and being durable under repetitive stretching; and furthermore having excellent weatherability under prolonged outdoor use.

We have engaged in extensive research work on support sheet in air layer-containing retroreflective sheeting, in particular, in encapsulated lens-type retroreflective sheeting, to discover that an excellent retroreflective sheeting which is free from the defects of conventional technology can be obtained by forming at least the surface layer of the support sheet from a resin composition comprising (a) thermofusible resin(s) having a glass transition temperature not higher than 50° C. and (b) cellulose derivative(s) having a glass transition temperature not lower than 90° C.

Thus, according to the present invention there is provided retroreflective sheeting which comprises a support sheet in one side of which retroreflective glass beads are embedded as substantially a monolayer, in such a manner that at least their non-reflective portions are exposed, and a light-transmittable protective film provided on said glass beads on the support sheet, said protective film being partially fixed on said support sheet, which is characterized in that at least the surface layer, in which the glass beads are embedded, of said support sheet is formed of a resin composition comprising (a) thermofusible resin(s) having a glass transition temperature not higher than 50° C. and (a) cellulose derivative(s) having a glass transition temperature not lower than 90° C.

Hereafter the retroreflective sheeting of the present invention is explained in further details and with the aid of the accompanying drawing.

The most characteristic feature of the retroreflective sheeting of the present invention is that at least the surface layer, which holds the glass beads as embedded therein and constitutes the bonds with the protective film, of the support sheet is formed from a resin composition which comprises (a) thermofusible resin(s) having a glass transition temperature not higher than 50° C. and (b) cellulose derivative(s) having a glass transition temperature not lower than 90° C.

In the retroreflective sheeting of the present invention, the surface layer of support sheet is formed from a composition composed basically of a thermofusible resin which fuses under heating to allow easy formation and shaping, having a glass transition temperature (Tg) not higher than 50° C., preferably from −50° C. to 30° C., more preferably from −30° C. to 20° C., so that the support sheet as a whole should exhibit excellent thermofusing and forming property and, when fused under heat, high adhesive strength should be obtained between the protective film and the bonds of the support sheet.

When Tg of the thermofusible resin is higher than 50° C., it is difficult to obtain the intended excellent thermofusing and forming property. In consequence, high adhesive strength between the protective film and the bonds of the support sheet also becomes difficult of attaining. That is, normally the bonds are formed by partially thermally fusing and fluidizing the support sheet with embossing rolls or the like so that the fused parts come to contact with, and fixed on, the protective film. In that occasion, if Tg of the thermofusible resin is too high, fluidability of the thermofused parts of the support sheet is impaired and the melt fails to create sufficient wettability at the interfaces of the protective film and the bonds, leading to insufficient adhesive strength therebetween.

Those thermofusible resins which are useful for the present invention desirably maintain their thermofusing characteristics even after their thermofusing and forming is completed and the produced retroreflective sheeting is finished, in addition to that they possess thermofusibility at the time of initial forming. Because, when the product under processing is subjected to a treatment, which is detrimental to the thermoforming property, such as crosslinking the thermofusible resin, the bonds and support sheet undergo shape or volume change, to create strain within the support sheet, which can be a cause of partial breakdown of retroreflective sheeting and also may lead to loss in pliability of said sheeting. Furthermore, while retroreflective sheeting is cut to an adequate shape and size suited for individual use, at the cut edge portions the sealed air cells are broken and lose hermetic property. When so broken cells are left unattended, retroreflective performance of the sheeting is impaired due to infiltration of water or moisture. Because the bonds at the cut edges are directly subject to actions of water, light or the like, they are more apt to deteriorate than those in the other parts during long-term outdoor use, and their adhesive strength, cohesive power, etc. are decreased to cause such troubles as peeling of protective film, etc. These troubles can be prevented by thermofusing and forming, and sealing the cut edge portions once again to regenerate the sealed air cells. Accordingly, it is very convenient for preventing such troubles that the thermofusible resin retains its thermofusibility at the time of the second thermofusing and forming step, i.e., that the support sheet is thermofusible.

Such thermofusible resin constituting at least the surface layer of the support sheet is not limited to specific material but various thermofusible resins can be used so long as they have the afore-described Tg characteristics and are capable of imparting excellent thermofusibility and pliability. In particular, resins having thermofusibility characteristics expressed by shearing stress at 180° C. (measured in accordance with JIS K-7199, at an extrusion rate of 5 mm/min.) normally within the range of $2\times10^5$–$1.5\times10^6$ dyne/cm$^2$, preferably $3\times10^5$–$1.3\times10^6$ dyne/cm$^2$ inter alia $4\times10^5$–$1.1\times10^6$ dyne/cm$^2$, are conveniently used.

As the thermofusible resins, normally non-crosslinking resins are used, while it is permissible to use lowly crosslinking resins within the range not notably impairing thermofusible property and the range not creating marked strain.

As such thermofusible resins, for example, acrylic resins, urethane resins, polyester resins, vinyl chloride resins, vinyl acetate resins, polyolefin resins, fluorine-containing resins and polyamide resins can be named, which are used each by itself or as copolymers with other resin component, or as resin blends. Of those, acrylic resins are preferred because of their excellent weatherability and ease in controlling the thermofusible characteristics. In particular, acrylic copolymers formed from at least two acrylic monomers are preferred.

Specific examples of suitable acrylic copolymers include acrylic copolymers having weight average molecular weight of 40,000–1,000,000, preferably 100,000–400,000, which are obtained through copolymerization by such methods as solution, suspension, emulsion or mass polymerization, of one or more monomers selected from those having no functional group in their side chains (hereafter referred to as non-functional monomers) such as alkyl (meth)acrylates, e.g. methyl acrylate, ethyl acrylate, propyl acrylate, butyl acrylate, 2-ethyl hexyl acrylate, methyl methacrylate, ethyl methacrylate, propyl methacrylate, buryl methacrylate, cyclohexyl methacrylate and 2-ethylhexyl methacrylate, as the main component; in combination with one or more monomers having such functional groups as OH, COOH or the like in their side chains (hereafter referred to as functional monomers) which are selected from 2-hydroxyethyl methacrylate; glycidyl methacrylate, acrylic acid, methacrylic acid, itaconic acid, and the like. Of those, the most preferred are such acrylic copolymers obtained through copolymerization of 50–90% by weight of a non-functional monomer or monomers which give polymers of relatively low Tg, such as ethyl acrylate, methyl acrylate, 2-ethylhexyl methacrylate, etc.; 10–50% by weight of non-functional monomer or monomers which give polymers having relatively high Tg, such as methyl methacrylate, isobutyl methacrylate, cyclohexyl methacrylate, etc.; and 0–10% by weight of a functional monomer or monomers such as 2-hydroxyethyl methacrylate, acrylic acid, itaconic acid, etc.

The resin composition, which forms at least the surface layer of the support sheet in the retroreflective sheeting of the present invention, also contains a cellulose derivative or derivatives having a Tg not lower than 90° C., besides the above thermofusible resin.

The cellulose derivatives function as modifying resin and are thought to impart excellent strength to withstand repetitive stretching and thermal resistance characteristics. It is presumed that consequently favorable properties such as good weatherability are imparted to the retroreflective sheeting of the invention.

As the cellulose derivatives, those having Tg not lower than 90° C. are used. When cellulose derivatives having Tg lower than 90° C. are used, it is generally difficult to impart excellent thermal resistance to the support sheet, and in consequence no retroreflective sheeting excelling in weatherability to withstand long-term outdoor use can be obtained.

The cellulose derivatives preferably have Tg of 100°–190° C., more preferably 100°–170° C.

While molecular weight of the cellulose derivatives is not critical, it is normally preferred to use those having a number average molecular weight of at least, 15,000, in particular, within the range 20,000–80,000, inter alia, 25,000–75,000. Excellent weatherability to withstand long-term outdoor use can be obtained by using cellulose derivatives of such molecular weight range.

Again the kind of cellulose derivatives is subject to no critical limitation, and various commercial cellulose derivatives are useful. Normally, however, it is preferred to use cellulose esters excelling in waterproofness and having high modifying effect. In particular, acyl esters of cellulose whose acylation ratio is 10–90%, preferably 30–70%, inter alia, 40–60%, are used with favorable results.

The retroreflective sheeting exhibiting the best weatherability can be obtained when at least one acyl ester of cellulose selected from the group consisting of cellulose acetate, cellulose acetate butyrate and cellulose acetate propionate is used.

In the retroreflective sheeting of the present invention, at least the surface layer of the support sheet is formed of a resin composition comprising (a) thermofusible resin(s) and (b) cellulose derivative(s) as described above. The resin composition may take such a form in which the thermofusible resin and cellulose derivative are compatible, forming a substantially homogeneously mixed composition; or a cellulose derivative having little compatibility with thermofusible resin may be used, in which case the cellulose derivative is substantially uniformly dispersed as micro or macro particles in the thermofusible resin matrix.

It is one of preferred embodiments for the present invention to use a multi-phase resin composition wherein a cellulose derivative is dispersed as the dispersed phase in the thermofusible resin as the matrix phase, which frequently is referred to as matrix-domain structure.

Such cellulose derivatives are normally used within a range 3.5–50 parts by weight, preferably 5–45 parts by weight, more preferably 10–40 parts by weight, inter alia, 20–40 parts by weight, per 100 parts by weight of the thermofusible resin composition.

The surface layer-forming resin composition may further contain, besides thermofusible resin and cellulose derivative, if necessary such various additives as coloring material, filler, ultraviolet absorber, photo-stabilizer, fluorescent brightening agent, or the like, within the ranges not markedly impairing the thermofusing characteristics of the composition.

It is another preferred embodiment of the present invention to use as the dispersed phase a fine granular-resin composed of individual spheres or compound spheres which are assemblies of plural individual spheres, of average particle diameter around 0.01–4.0 μm, which has been rendered insoluble or difficulty soluble in ordinary organic solvents, and/or thermally infusible or difficultly fusible, through crosslinking reaction or marked increase in molecular weight [more specifically, the fine powdery polymers posted in the listing of commercial names and makers of fine powdery polymers at page 100 of "Engineering Materials" Vol. 38, No. 9, Aug. 1990 (published by Nikkan Kogyo Shinbunsha); and the multi-layer structured polymer compositions as described in U.S. Pat. No. 4,025,525 (Japanese Patent Publication No. 36645/1984), etc.] as dispersed in a thermofusible resin matrix.

The blend ratios of those components forming the resin composition are preferably so selected that the tensile strength exhibited by the composition in film form at 70° C. generally ranges 20–95 kgf/cm$^2$, in particular, 25–90 kgf/cm$^2$, in order to attain favorable physical properties such as high thermal resistance characteristics and pliability.

Thickness of the surface layer is not critical, so long as it exceeds the thickness allowing embedment of the used glass beads to at least their lower hemispheres. While the thickness can be optionally selected depending, for example, on particle diameter of the glass beads, generally adequate surface layer thickness is 20–150 μm, preferably 30–120 μm, inter alia, 50–100 μm, in consideration of such factors as that normally used glass beads have diameters ranging 20–150 μm, in particular, 30–100 μm; necessity to fastly hold the glass beads by the embedment and to secure excellent thermofusibility and formability; and the production costs. In the retroreflective sheeting of the present invention, the support sheet may be of a single-layered structure, being composed of the surface layer only. Whereas, for the purpose of achieving better tensile strength and better thermofusibility and formability, etc., the support sheet is preferably given a multi-layered structure comprising at least two layers, i.e., a surface layer formed of the resin composition composed of a thermofusible resin or resins having a Tg not higher than 50° C. and a cellulose derivative or derivatives having a Tg not lower than 90° C., in which retroreflective glass beads are embedded as substantially a monolayer with at least their non-reflective parts exposed on the layer; and a reinforcing layer formed on the opposite side to the glass beads-embedded surface of said surface layer.

For the purpose of imparting still more preferred physical properties such as thermofusibility and formability, tensile strength, etc. to the support sheet, it is generally desirable for the reinforcing layer to have a shearing stress at 180° C. ranging $6 \times 10^6$–$1.2 \times 10^7$ dyne/cm$^2$, preferably $7 \times 10^6$–$1.1 \times 10^7$ dyne/cm$^2$, inter alia, $8 \times 10^6$–$1.0 \times 10^7$ dyne/cm$^2$ and/or a tensile strength at 23° C. of at least 0.6 kg/25 mm, preferably at least 0.9 kg/25 mm, inter alia, 1.0–2.0 kg/25 mm and/or an elongation-at-break ranging 10–150%, preferably 20–100%, inter alia, 30–90%.

As resins that are useful for forming a reinforcing layer having such properties, for example, acrylic resins, urethane resins, polyester resins, vinyl chloride resins, vinyl acetate resins, polyolefin resins, fluorine-containing resins and polyamide resins may be named. They may be used each by itself or as copolymerized or blended with other resin or resins. Of those, particularly acrylic resins which excel in weatherability are preferred, in particular, crosslinked acrylic resins being preferred.

Examples of suitable crosslinked acrylic resins include those obtained by copolymerizing one or more monomers selected from such non functional monomers as methyl acrylate, ethyl acrylate, propyl acrylate, butyl acrylate, 2-ethylhexyl acrylate, methyl methacrylate, ethyl methacrylate, propyl methacrylate, butyl methacrylate, cyclohexyl methacrylate, 2-ethylhexyl methacrylate and the like, as the chief component, with one or more functional monomers selected from 2-hydroxyethyl acrylate, 2-hydroxyethyl methacrylate, glycidyl methacrylate, acrylic acid, itaconic acid, etc., by such a polymerization method as solution, suspension, emulsion or mass polymerization; and crosslinking so obtained reactive acrylic resins having weight average molecular weight ranging 10,000–500,000, preferably 30,000–300,000 and containing functional groups using, for example, isocyanate-, melamine- or metal-type crosslinking agents. Of those, particularly preferred crosslinked acrylic resins are obtained by adding, to a reactive acrylic resin obtained by copolymerization of 80–97% by weight of non-functional monomer or monomers such as ethyl acrylate, methyl acrylate, 2-ethylhexyl methacrylate, butyl methacrylate, cyclohexyl methacrylate and methyl methacrylate; and 3–20% by weight of functional monomer or monomers such as acrylic acid, itaconic acid and 2-hydroxyethyl methacrylate, 0.5–1.0 equivalent to the functional groups in the resin of an isocyanate-type or melamine-type crosslinking agent to cause the crosslinkage.

Thickness of the reinforcing layer is subject to no critical limitation. Whereas, with the view to obtain more preferable thermofusibility and formability and to avoid excessive hardening of the produced retroreflective sheeting, normally it is adequate to design the thickness to be 5–100 μm, preferably 5–50 μm, more preferably 10–30 μm. It is generally preferred, furthermore, that thickness of the reinforcing layer should be less than that of the surface layer, for obtaining such characteristics as still better thermofusibility, formability and pliability.

The retroreflective sheeting of the present invention can be easily prepared using heretofore known materials and through known methods, such as those described in U.S. Pat. No. 4,897,136 (Japanese Laid-open Patent Application KOKAI No. 121043/'87) or Japanese Laid-open Patent Application KOKAI No. 196653/'90, excepting that at least the surface layer in which glass beads are embedded of the support sheet is formed of a resin composition comprising thermofusible resin having a Tg not higher than 50° C. and cellulose derivative having a Tg not lower than 90° C. An example of preparing the sheeting is as follows.

In a provisional support made of, for example, polyethylene laminated process paper, glass beads having a refractive index of 1.7–2.0 and an average particle diameter of about 20–150 μm are embedded to about ⅓–½ of said diameter. On the glass beads-exposed side of said provisional support, a metal such as aluminum is vacuum-deposited to cover approximately hemispheres of said glass beads with the vacuum-deposited metal coating. Then a support sheet following the present invention, which is formed on another provisional support such as a polyethylene terephthalate process film, is superposed on the glass beads-bearing provisional support, the support sheet facing the metallized glass beads, and the two are pressure-laminated to cause embedment of the glass beads into the support sheet to about ⅓–½ of the bead-diameter. Thereafter the provisional support made of polyethylene laminate process paper or the like is peeled off, and on whereby exposed glass bead surfaces a light-transmittable protective film, e.g., an acrylic film, is placed. By heating the support sheet with, for example, embossing rolls to partially press and fuse the sheet to form bonds between the protective film and the support sheet, a retroreflective sheeting can be prepared.

Formation of the surface layer from the resin composition as described above can be effected, for example, by extrusion molding comprising mixing the thermofusible resin, cellulose derivative and other necessary additives in powdery and pelletized form, thermofusing the mixture and extruding the melt; or by solution or dispersion casting method comprising mixing the thermofusible resin, cellulose derivative and other necessary additives in a solvent to form a solution or dispersion composition, casting the composition with a prescribed thickness onto a processing substrate such as polyester film or process (release) paper, or onto another layer such as a pre-formed reinforcing layer if occasion demands, and removing the solvent to form the surface layer. In particular, such solution casting method is conveniently practiced, which excels in thickness precision of the resultant film-formed product and allows easy adjustment of dissolved or dispersed state of the cellulose derivative.

In the retroreflective sheeting of the present invention the light-transmittable protective film is partially bound to, and fixed on, the support sheet upon partial thermofusion and formation of the support sheet, and whereby the retroreflective sheeting having sealed air cells defined by the protective film, bonds and the support sheet is prepared. In respect of appropriate processability of the retroreflective sheeting, that is, because the sheeting is cut to optional sizes and shapes required for individual usage, it is desirable to form a network of continuous, linear bonding walls by said partial thermofusion and formation of the support sheet so as to form a large number of hermetically sealed small compartment cells each occupying an area of about 10–100 mm$^2$ between the support sheet and the protective film, to provide a "capsule-type" retroreflective sheeting, so as to avoid infiltration of rain water, etc. from the cut edges to spread to the whole of the sheeting.

Any known film is useful as the protective film in the retroreflective sheeting of the present invention, so long as it is light-transmittable. More specifically, resin films of a thickness ranging about 20–200 μm, preferably 40–150 μm, and a total light transmittance of about 20–100%, preferably 30–95%, composed chiefly of acrylic resin, urethane resin, polyester resin, vinyl chloride resin, vinyl acetate resin, polyolefin resin, fluorine-containing resin, polyamide resin, etc. may be used. In particular, acrylic resin film excelling in weatherability is preferred. The most preferred is a multiphase resin composition film composed of a matrix phase formed of thermofusible acrylic resin and a dispersed phase of multilayer polymer particles (e.g., such particles as described in Japanese Patent Publication No. 36645/84, U.S. Pat. No. 4,052,525).

Figure 1:
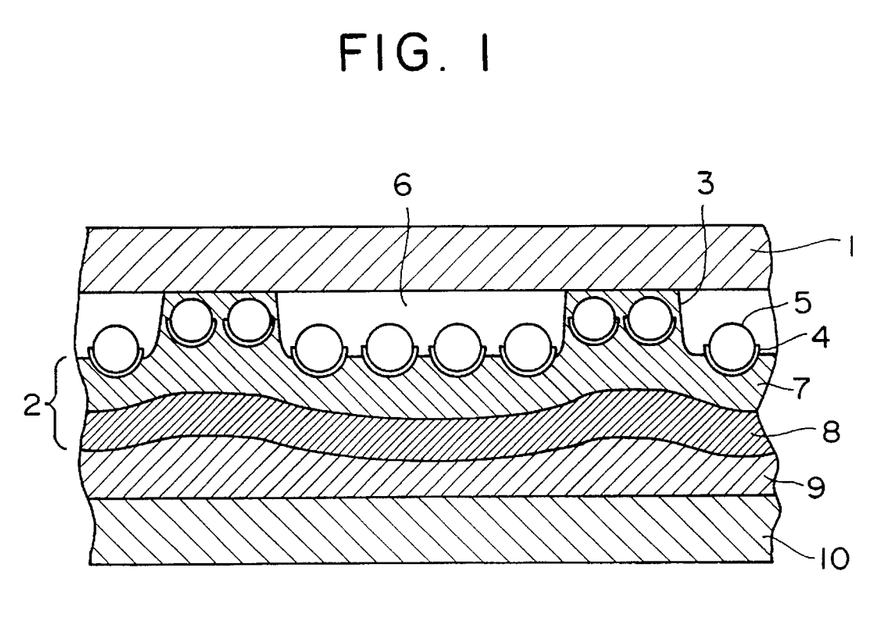
The accompanying FIGURE is a cross-sectional schematic view of an embodiment of retroreflective sheeting according to the invention.

FIG. 1 shows a schematic construction by cross-section of an encapsulated lens-type retroreflective sheeting, a preferred embodiment of the retroreflective sheeting of the present invention.

In FIG. 1, 1 is a light-transmittable protective film, which normally has a thickness of 20–200 μm and is a transparent film either colored or non-colored: 2 is a support sheet which is composed of a surface layer 7 in which glass beads 5 are embedded and held, and if desired, a reinforcing layer 8 formed on the back of said surface layer 7: 3 denotes the continuous, linear connecting walls formed by partial thermofusion and formation of said surface layer of the support sheet, e.g., by an embossing treatment, said connecting walls forming hermetically sealed, small compartment cells 6 between the protective film and the support sheet. In said cells a gas having low refractive index such as air is hermetically sealed. As the glass beads 5, normally those having a refractive index of about 1.9 and an average particle diameter of about 20–150 μm are used. Approximately lower hemispheres of the glass beads are covered with a metal such as aluminum by vacuum-deposition to serve as the light-reflecting portion, thus providing retroreflective glass beads. In the hermetically sealed small compartment cells, the retroreflective glass beads are embedded in the surface layer 7 to about ⅓–½ of their diameters and whereby held on the support sheet. In FIG. 1, 9 is normally an adhesive layer of a thickness ranging about 20–100 μm, and 10 is a release substrate of a thickness ranging about 20–200 μm, made of, for example, silicone-surface treated polypropylene film. When the retroreflective sheeting is adhered to a base on which it is to be used, said release substrate 10 is peeled off, the retroreflective sheeting is laminated on said base and adhered and fixed thereon by the adhesive layer 9.

As described in the foregoing, by forming at least the surface layer, in which glass beads are embedded, of the support sheet from (a) resin composition comprising the thermofusible resin(s) having a Tg not higher than 50° C. and (b) the cellulose derivative(s) having a Tg not lower than 90° C., according to the invention, there can be obtained a support sheet exhibiting many excellent characteristics including not only superior thermofusibility and formability, high adhesive strength between the protective film and the bonds of the support sheet formed after its thermofusion and formation and high tensile strength of said bonds as well as the support sheet itself, but also excellent pliability and strength which allow the sheet to withstand repetitive stretching and superior weatherability allowing maintenance of the high performance level of the sheet under prolonged outdoor use. In consequence, retroreflective sheeting having excellent weatherability in prolonged outdoor use can be obtained, which is resistant to rigorous meteorological conditions from severe heat to bitter cold and exhibits little deterioration in the retroreflective performance, color, etc. under prolonged exposure of sunlight, rain, snow, and the like.

Because the retroreflective sheeting of the present invention retains thermofusibility at least at the surface layer side of the support sheet, furthermore, the retroreflective sheeting of the invention also has the advantage that edge portions of the sheeting as cut to any desired size and shape can be sealed by thermofusing and forming.

The support sheet according to the present invention, whose at least the surface layer is formed of the resin composition comprising the specified thermofusible resin and the cellulose derivative, can be equally used in other types of retroreflective sheeting with capsules, such as encapsulated cube-corner type retroreflective sheeting.

Hereinafter the invention is still more specifically explained, referring to examples and comparative examples.

Examples 1–16, 20–34 and Comparative Examples 1, 3–10

A process paper formed by laminating a polyethylene having a softening temperature of about 105° C. to a paper was heated to about 105° C., onto which glass beads having an average diameter of about 65 μm and a refractive index of about 1.91 were uniformly and densely dispersed in a monolayer. The beads-dispersed surface was pressed with nip rolls, and the glass beads were embedded to about ⅓ of their diameter in the polyethylene.

The glass beads-exposed surface was vacuum-deposited with aluminum, whereby forming an about 0.1 μm thick vapor coated film on approximately the hemispherical surfaces of the glass beads.

Then on a 20 μm thick polyethylene terephthalate film which had been given a treatment for peeling off, each of liquid dispersions formed by mixing and stirring: as a thermofusible resin, 167 parts by weight of an acrylic resin solution containing 30% solid [a methyl isobutyl ketone/ toluene solution of an acrylic copolymer of a weight average molecular weight about 300,000, obtained from copolymerization of ethyl acrylate 53 wt. %, methyl methacrylate 46 wt. %, 2-hydroxyethyl methacrylate 1 wt. % and acrylic acid 0.1 wt. %: commercial name Nissetsu KP-1684A, manufactured by Nippon Carbide Kogyo Kabushiki Kaisha (Nippon Carbide Industries Co., Inc. hereafter "Nippon Carbide")]; also as a thermofusible resin, 125 parts by weight of an acrylic resin solution containing 40% solid [a methyl isobutyl ketone/toluene solution of an acrylic copolymer having a weight average molecular weight of about 250,000, obtained from copolymerizing ethyl acrylate 66 wt. %, methyl methacrylate 33 wt. % and acrylic acid 1 wt. %: commercial name Nissetsu KP-1703A, manufactured by Nippon Carbide]; as cellulose derivatives, those indicated in Table 1 by the amounts as indicated in Table 3; granular crosslinked resins as indicated in Table 2 by the amounts as indicated in Table 3; 50 parts by weight of rutile form titanium oxide and 30 parts by weight of methyl isobutyl ketone, were applied. Removing the solvents, about 80 μm thick support sheets were prepared.

Each of thus formed support sheets was placed on the previously formed vapor coated glass beads-embedding process paper, with the glass beads coming into contact with the support sheet, and the glass beads were embedded to about ⅓ of their diameter in the support sheet with a linear pressure of 900 kg/m under heating at 70° C.

Thereafter the polyethylene resin laminate paper was peeled off, to transfer the glass beads into the support sheet.

Then on the support sheet onto which the glass beads were transferred, an unoriented acrylic film, as a light-transmittable protective film which was about 75 μm thick and had a total light transmittance of about 93% (a multiphase resin composition film having in a methyl methacrylate resin matrix phase a dispersed phase of multilayered crosslinked polymer particles having an average particle diameter of about 0.1 μm, which were composed chiefly of methyl methacrylate and butyl acrylate) was superposed in contact with the glass beads, and these were together passed between a metal roll embossed with a network of ridges of about 0.3 mm in line width and whose surface temperature was raised to about 190° C., and a rubber roll with the surface temperature of about 60° C., the acrylic film side of the system coming into contact with the rubber roll. During the passage the metal roll was pressed against the release polyethylene terephthalate film side of the system to effect partial thermofusion and forming treatment.

From the resulting thermofused and formed product, the release polyethylene terephthalate film was removed, and on the support sheet side thereof, an about 40 μm-thick layer of an acrylic pressure-sensitive adhesive agent (Nissetsu KP-997, a commercial product of Nippon Carbide) as formed separately on an about 75 μm-thick, silicone-treated polyethylene terephthalate release film was laminated. Whereupon a retroreflective sheeting was provided.

Examples 17–19, 35–37 and Comparative Example 2

On a 20 μm-thick release polyethylene terephthalate film, a composition composed of 100 parts by weight of an acrylic resin solution containing 50% solid (a methyl isobutyl ketone/toluene solution of an acrylic copolymer having a weight average molecular weight of about 120,000 which was obtained through copolymerization of 65 wt. % of ethyl acrylate, 21 wt. % of methyl methacrylate and 14 wt. % of 2-hydroxyethyl methacrylate; commercial name ST-700, manufactured by Tokushu Shikiryo Kogyo K. K.) and 14.2 parts by weight of hexamethylene diisocyanate type crosslinking agent with 75 wt. % solid was coated and dried to form an about 30 μm thick reinforcing layer. On said layer the surface layers as formed in Examples 1–16, 20–34 and Comparative Examples 1 and 3–10 were formed. Except that so formed two-layer structured support sheets were used, the procedures as employed in Example 1 and Comparative Example 1 were followed to prepare retroreflective sheetings.

Performance of each of so obtained retroreflective sheeting was as indicated in Table 4. The retroreflective sheeting of the present invention exhibited little deterioration in reflectivity, little shrinkage, nearly no peeling of the protective film and little color change even after rigorous weatherability test. Thus the products were confirmed to have excellent weatherability.

The measurement methods employed in the tests as listed in Table 4 were as follows.

(1) Tensile strength at 70° C. of the surface layer

The measurement was conducted as to the support sheet when the sheet consisted of the surface layer alone; and as to the monolayer sheet serving as the surface layer alone, when the support sheet contained other layers such as a reinforcing layer, besides the surface layer.

(measurement method)

Each test specimen was cut to a 25 mm wide and 150 mm long piece which was allowed to stand for 30 minutes at 70° C. Thereafter the piece was subjected to a tensile test with TENSILON (commercial name, a tensile tester manufactured by ORIEnTEC Corporation) at a clamp distance of 100 mm and a pull rate of 200 mm/min. The maximum stress measured in the tensile test was recorded as the tensile strength.

(2) Weatherability test of retroreflective sheeting

Each retroreflective sheeting was cut to a size 50 mm×50 mm, from which the silicone-treated polyethylene terephthalate release film was peeled off, and the remaining retroreflective sheeting was adhered onto an aluminum panel.

Thus adhered test specimen was placed in an accelerated weatherability tester (Photo-control Weather-O-Meter, manufactured by Suga Shikenki K. K.) and subjected to 500-hour accelerated weatherability test.

Thereafter the specimen was withdrawn from the tester, and subjected to a thermal shock test using a cold-heat cycle tester (Heat Shock Chamber TSR-63, manufactured by TABAI ESPEC Corporation).

The cold-heat cycle was repeated 200 times, single cycle consisting of the following:

−40° C.×30 min.→room temp.×15 min.→145° C.×30 min.→room temp.×15 min.

(measurement method)
1) Deterioration in reflectivity (%)

Retroreflective performance of each test piece after the weatherability test was measured with the measuring machine as later identified. The result was compared with the performance before the weatherability test, and the deterioration (%) in the retroreflective performance was calculated by the formula below:

$$\left(1 - \frac{\text{retroreflective performance after weatherability test}}{\text{retroreflective performance before weatherability test}}\right) \times 100$$

Retroreflectivity-measuring machine: Model 920 manufactured by Advanced Retro Technology, Inc.

As the angular conditions, adopted were angle of observation, 0.2°, and angle of incidence, 5°.

2) Shrinkage length (mm)

Length of the maximum shrinkage which occurred in the protective film in the test piece after the weatherability test was measured from the original end and recorded as the shrinkage length.

3) Peeled length of protective film (mm)

The maximum length of the part of the protective film at which the bonds of the test piece was broken after the weatherability test was measured from the end, and recorded as the peeled length of protective film.

4) Whitening ratio (ΔY) (%)

Color of the test piece after the weatherability test was measured with Color Tester SC-2-CH (manufactured by Suga Shikenki K. K.) using Y, x, y-color indicating system. The result was compared with the color before the weatherability test. The whitening ratio was calculated according to the formula below:

$$\left(\frac{Y \text{ after weatherability test}}{Y \text{ before weatherability test}} - 1\right) \times 100$$

TABLE 2

| | Granular Crosslinked Resins | |
|---|---|---|
| | Composition | Average particle diameter (μm) |
| No. 1 | methyl methacrylate-type multilayer-structured crosslinked resin commercial name: LBS manufactured by Mitsubishi Rayon Kabushiki Kaisha | 0.1 |
| No. 2 | methyl methacrylate-type monolayer-structured crosslinked resin commercial name: Fine Powder MP-300 manufactured by Soken Kagaku Kabushiki Kaisha | 0.1 |
| No. 3 | methyl methacrylate-type monolayer-structured crosslinked resin commercial name: KM-334 manufactured by Rohm & Haas Co. | 0.2 |
| No. 4 | methyl methacrylate-type monolayer-structured crosslinked resin commercial name: Fine Powder MR-2HG manufactured by Soken Kagaku Kabushiki Kaisha | 4.3 |
| No. 5 | styrene-type monolayer-structured crosslinked resin commercial name: SB10X-6 manufactured by Sekisui Kaseihin Kogyo Kabushiki Kaisha | 5.8 |

TABLE 1

| | | Cellulose Derivatives | | | |
|---|---|---|---|---|---|
| | Composition | Acetylation ratio (%) | Total acylation ratio (%) | Glass transition temp. (°C.) | Number average molecular weight |
| No. 1 | Cellulose acetate butyrate | 13.5 | 52 | 130 | 30,000 |
| No. 2 | Cellulose acetate propionate | 2.5 | 48 | 142 | 25,000 |
| No. 3 | Cellulose acetate butyrate | 13.5 | 51 | 141 | 70,000 |
| No. 4 | Cellulose acetate propionate | 2.5 | 49 | 147 | 75,000 |
| No. 5 | Cellulose acetate butyrate | 2.0 | 55 | 85 | 16,000 |
| No. 6 | Cellulose acetate butyrate | 18.5 | 50 | 127 | 12,000 |

TABLE 3

Blend Ratio (by weight) of Cellulose Derivatives and Granular Crosslinked Resin

| | Cellulose derivative | | | | | | Granular crosslinked resin | | | | |
|---|---|---|---|---|---|---|---|---|---|---|---|
| | No. 1 | No. 2 | No. 3 | No. 4 | No. 5 | No. 6 | No. 1 | No. 2 | No. 3 | No. 4 | No. 5 |
| Example | | | | | | | | | | | |
| 1 | 2.5 | | | | | | | | | | |
| 2 | 5 | | | | | | | | | | |
| 3 | 10 | | | | | | | | | | |
| 4 | 20 | | | | | | | | | | |
| 5 | 30 | | | | | | | | | | |
| 6 | 40 | | | | | | | | | | |
| 7 | 50 | | | | | | | | | | |
| 8 | | 2.5 | | | | | | | | | |
| 9 | | 5 | | | | | | | | | |
| 10 | | 20 | | | | | | | | | |
| 11 | | 40 | | | | | | | | | |
| 12 | | 50 | | | | | | | | | |
| 13 | | | 20 | | | | | | | | |
| 14 | | | | 20 | | | | | | | |
| 15 | | | | | | 20 | | | | | |
| 16 | | | | | | 40 | | | | | |
| 17 | 2.5 | | | | | | | | | | |
| 18 | 5 | | | | | | | | | | |
| 19 | 20 | | | | | | | | | | |
| 20 | 2.5 | | | | | | 10 | | | | |
| 21 | 5 | | | | | | 5 | | | | |
| 22 | 5 | | | | | | 10 | | | | |
| 23 | 5 | | | | | | 20 | | | | |
| 24 | 5 | | | | | | 30 | | | | |
| 25 | 5 | | | | | | 40 | | | | |
| 26 | 10 | | | | | | 10 | | | | |
| 27 | 10 | | | | | | 20 | | | | |
| 28 | 10 | | | | | | 40 | | | | |
| 29 | 5 | | | | | | | 5 | | | |
| 30 | 5 | | | | | | | 10 | | | |
| 31 | 5 | | | | | | | 20 | | | |
| 32 | 5 | | | | | | | | 10 | | |
| 33 | 5 | | | | | | | | | 10 | |
| 34 | 5 | | | | | | | | | | 10 |
| 35 | 5 | | | | | | 10 | | | | |
| 36 | 10 | | | | | | 10 | | | | |
| 37 | 5 | | | | | | 10 | | | | |
| Comparative Example | | | | | | | | | | | |
| 1 | 0 | | | | | | | | | | |
| 2 | 0 | | | | | | | | | | |
| 3 | | | | | | | 5 | | | | |
| 4 | | | | | | | 10 | | | | |
| 5 | | | | | | | 20 | | | | |
| 6 | | | | | | | 30 | | | | |
| 7 | | | | | | | | 10 | | | |
| 8 | | | | | | | | 20 | | | |
| 9 | | | | | 20 | | | | | | |
| 10 | | | | | 40 | | | | | | |

TABLE 4

| | Physical properties of surface layer at 70° C. | | Weatherability test of retroreflective sheet | | | |
|---|---|---|---|---|---|---|
| | Tensile strength (kgf/cm$^2$) | Elongation (%) | Deterioration in retroreflectivity (%) | Shurinkage length (mm) | Peeled length of protective film (mm) | Whitening ratio (ΔY) (%) |
| Example | | | | | | |
| 1 | 6 | >2,000 | 5 | 2 | 1 | 7 |
| 2 | 10 | >2,000 | 0 | 1 | 0 | 0 |
| 3 | 24 | 1,900 | 0 | 0.5 | 0 | 0 |
| 4 | 45 | 470 | 0 | 0 | 0 | 0 |
| 5 | 60 | 360 | 0 | 0 | 0 | 0 |
| 6 | 92 | 230 | 0 | 0 | 0 | 0 |
| 7 | 100 | 150 | 5 | 1 | 2 | 3 |

TABLE 4-continued

| | Physical properties of surface layer at 70° C. | | Weatherability test of retroreflective sheet | | | |
|---|---|---|---|---|---|---|
| | Tensile strength (kgf/cm²) | Elongation (%) | Deterioration in retroreflectivity (%) | Shurinkage length (mm) | Peeled length of protective film (mm) | Whitening ratio (ΔY) (%) |
| 8 | 5 | >2,000 | 7 | 2 | 8 | 2 |
| 9 | 11 | >2,000 | 0 | 1 | 0 | 0 |
| 10 | 23 | >2,000 | 0 | 0.5 | 0 | 0 |
| 11 | 30 | 1,110 | 0 | 0 | 0 | 0 |
| 12 | 106 | 130 | 6 | 1 | 2 | 4 |
| 13 | 36 | 490 | 0 | 0.5 | 0 | 0 |
| 14 | 51 | 600 | 0 | 0.5 | 0 | 0 |
| 15 | 10 | >2,000 | 4 | 1 | 0 | 0 |
| 16 | 45 | 670 | 3 | 0.5 | 0 | 0 |
| 17 | 6 | >2,000 | 4 | 1 | 0 | 6 |
| 18 | 12 | >2,000 | 0 | 0 | 0 | 0 |
| 19 | 45 | 470 | 0 | 0 | 0 | 0 |
| 20 | 8 | >2,000 | 0 | 2 | 1 | 2 |
| 21 | 11 | >2,000 | 0 | 1 | 0 | 0 |
| 22 | 14 | >2,000 | 0 | 1 | 0 | 0 |
| 23 | 16 | 1,420 | 0 | 1 | 0 | 0 |
| 24 | 17 | 1,210 | 0 | 1 | 0 | 0 |
| 25 | 19 | 1,210 | 5 | 1 | 2 | 5 |
| 26 | 26 | 1,770 | 0 | 0.5 | 0 | 0 |
| 27 | 30 | 910 | 0 | 0.5 | 0 | 0 |
| 28 | 17 | 800 | 7 | 1 | 3 | 9 |
| 29 | 12 | >2,000 | 0 | 1 | 0 | 0 |
| 30 | 21 | 1,190 | 0 | 1 | 0 | 0 |
| 31 | 28 | 920 | 0 | 1 | 0 | 0 |
| 32 | 45 | 1,710 | 0 | 1 | 0 | 0 |
| 33 | 5 | >2,000 | 3 | 1 | 0 | 3 |
| 34 | 5 | >2,000 | 4 | 1 | 0 | 6 |
| 35 | 8 | >2,000 | 0 | 1 | 0 | 0 |
| 36 | 16 | >2,000 | 0 | 0 | 0 | 0 |
| 37 | 31 | >2,000 | 0 | 0.5 | 0 | 0 |
| Comparative Example | | | | | | |
| 1 | 3 | >2,000 | 24 | 4 | 15 | 41 |
| 2 | 3 | >2,000 | 79 | 2 | 0 | 40 |
| 3 | 3 | >2,000 | 24 | 4 | 14 | 25 |
| 4 | 4 | >2,000 | 25 | 4 | 13 | 11 |
| 5 | 5 | >2,000 | 17 | 4 | 11 | 5 |
| 6 | 8 | >2,000 | 14 | 4 | 10 | 0 |
| 7 | 4 | >2,000 | 13 | 4 | 12 | 3 |
| 8 | 5 | >2,000 | 10 | 3 | 9 | 0 |
| 9 | 3 | >2,000 | 26 | 4 | 14 | 30 |
| 10 | 3 | >2,000 | 24 | 4 | 10 | 25 |

What is claimed is:

1. Retroreflective sheeting comprising a support sheet comprising a surface layer, retroreflective glass beads having reflective and non-reflective portions, reflective portions of said beads being embedded in said surface layer as substantially a monolayer and non-reflective portions thereof protruding out of said surface layer, and a light-transmissive protective film overlying the retroreflective glass beads and bonded at a portion of the surface thereof to the support sheet;

wherein the surface layer of the support sheet comprises a resin composition comprising (a) at least one thermofusible resin having a glass transition temperature not higher than 50° C. and a shearing stress in the range of $2 \times 10^5$ to $1.5 \times 10^6$ dyne/cm², and (b) at least one cellulose derivative having a glass transition temperature not lower than 90° C.

2. Retroreflective sheeting as set forth in claim 1, in which the at least one cellulose derivative has a number average molecular weight of at least 15,000.

3. Retroreflective sheeting according to claim 1, in which the at least one cellulose derivative has a glass transition temperature within the range from 100° to 190° C.

4. Retroreflective sheeting as set forth in claim 1, in which the at least one cellulose derivative is cellulose ester.

5. Retroreflective sheeting as set forth in claim 4, in which the at least one cellulose ester is acyl ester of cellulose having an acylation ratio of 10–90%.

6. Retroreflective sheeting as set forth in claim 5, in which the acyl ester of cellulose is at least one cellulose ester selected from the group consisting of cellulose acetate, cellulose acetate butyrate and cellulose acetate propionate.

7. Retroreflective sheeting as set forth in claim 1, in which the at least one thermofusible resin has a glass transition temperature within the range from –50° to 30° C.

8. Retroreflective sheeting as set forth in claim 1, in which the at least one thermofusible resin has a shearing stress within the range from $3 \times 10^5$ to $1.3 \times 10^6$ dyne/cm².

9. Retroreflective sheeting as set forth in claim 1, in which the at least one thermofusible resin is an acrylic copolymer.

10. Retroreflective sheeting as set forth in claim 1, in which the resin composition is a multiphase resin composition comprising a matrix phase comprising (a) said thermofusible resin(s) and a dispersed phase composed of (b) said cellulose derivative(s).

11. Retroreflective sheeting as set forth in claim 1, in which the resin composition contains, per 100 parts by weight of the thermofusible resin(s), 3.5–50 parts by weight of a cellulose derivative(s).

12. Retroreflective sheeting as set forth in claim 1, in which the resin composition contains, per 100 parts by weight of the thermofusible resin(s), 5–45 parts by weight of the cellulose derivative(s).

13. Retroreflective sheeting as set forth in claim 1, in which the tensile strength of the resin composition in film form ranges from 20 to 95 kgf/cm$^2$ (70° C.).

14. Retroreflective sheeting as set forth in claim 1, in which the surface layer is formed by solution casting method.

15. Retroreflective sheeting as set forth in claim 1, wherein the support sheet comprises said surface layer and a reinforcing layer.

16. Retroreflective sheeting as set forth in claim 15, in which the reinforcing layer comprises crosslinked resin(s) which exhibit a shearing stress within the range from $6 \times 10^6$ to $1.2 \times 10^7$ dyne/cm$^2$ at 180° C.

17. Retroreflective sheeting as set forth in claim 15, in which the surface layer has a thickness of 20 to 200 μm.

18. Retroreflective sheeting as set forth in claim 16, in which the reinforcing layer has a thickness of 5 to 100 μm.

19. Retroreflective sheeting as set forth in claim 18, in which the thickness of the surface layer is greater than that of the reinforcing layer.

20. Retroreflective sheeting as set forth in claim 15, in which the reinforcing layer has a tensile strength of at least 0.6 kg/25 mm.

21. Retroreflective sheeting as set forth in claim 15, in which the reinforcing layer has an elongation-at-break within the range from 10 to 150%.

22. Retroreflective sheeting as set forth in claim 1, in which the protective film is thermofused to the support sheet to form a plurality of continuous linear bonds between the protective film and the support sheet to thereby form a large number of hermetically sealed small compartment cells between the support sheet and the protective film.

23. Retroreflective sheeting as set forth in claim 1, in which the protective film comprises a multiphase resin composition which comprises a matrix phase formed of thermofusible resin(s) and a dispersed phase formed of multi-layered polymer particles.

24. Retroreflective sheeting as set forth in claim 1 wherein at least the surface layer of the support sheet further comprises dispersed in the at least one thermofusible resin, at least substantially insoluble or substantially thermally infusible or both insoluble and thermally infusible, fine granular-resin particles of average particle diameter in the range of about 0.01 to 4.0 microns.

25. Retroreflective sheeting as set forth in claim 1 wherein at least the surface layer of the support sheet further comprises a dispersed phase comprising granular cross-linked resin.

26. Retroreflective sheeting as set forth in claim 1 wherein the reflective portions of said retroreflective glass beads comprise a vacuum-deposited metal coating.

* * * * *